Aug. 14, 1956 X. B. K. GREEN ET AL 2,758,589
BROILERS
Filed June 18, 1953 2 Sheets-Sheet 1
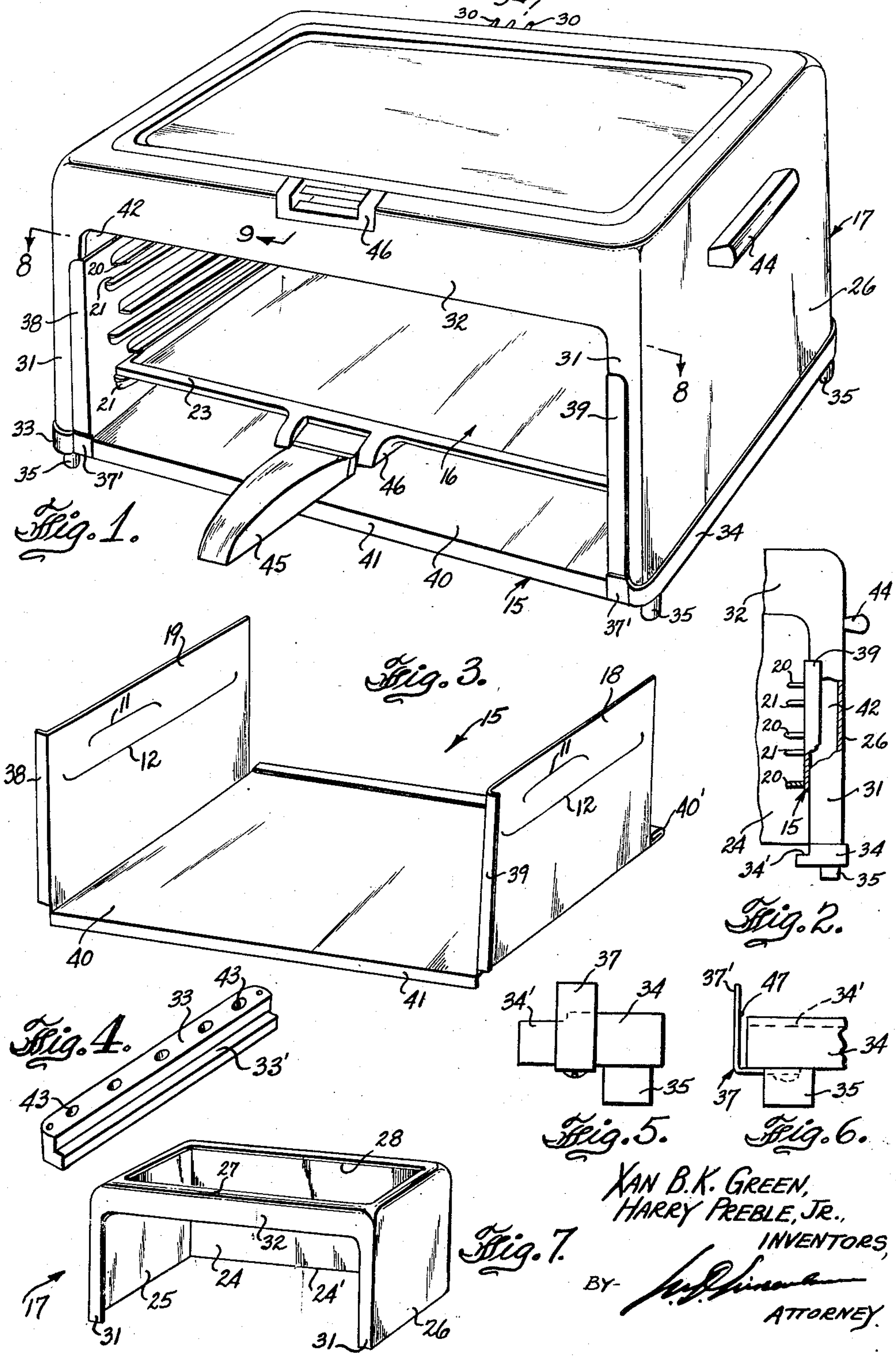
XAN B. K. GREEN,
HARRY PREBLE, JR.,
INVENTORS,
BY- [signature]
ATTORNEY.

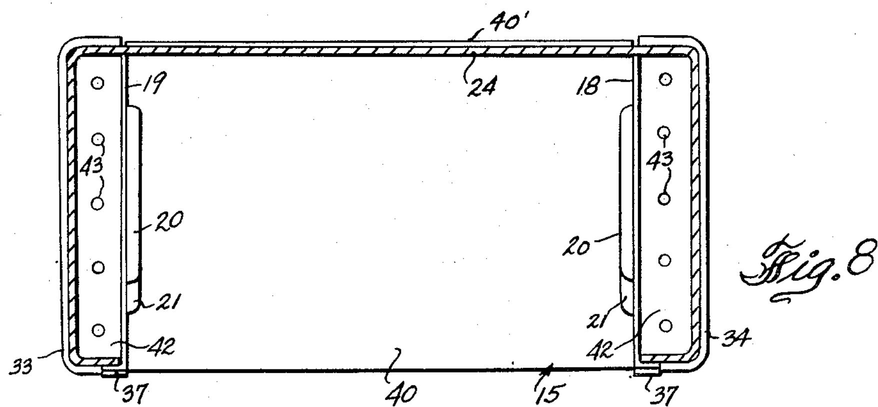
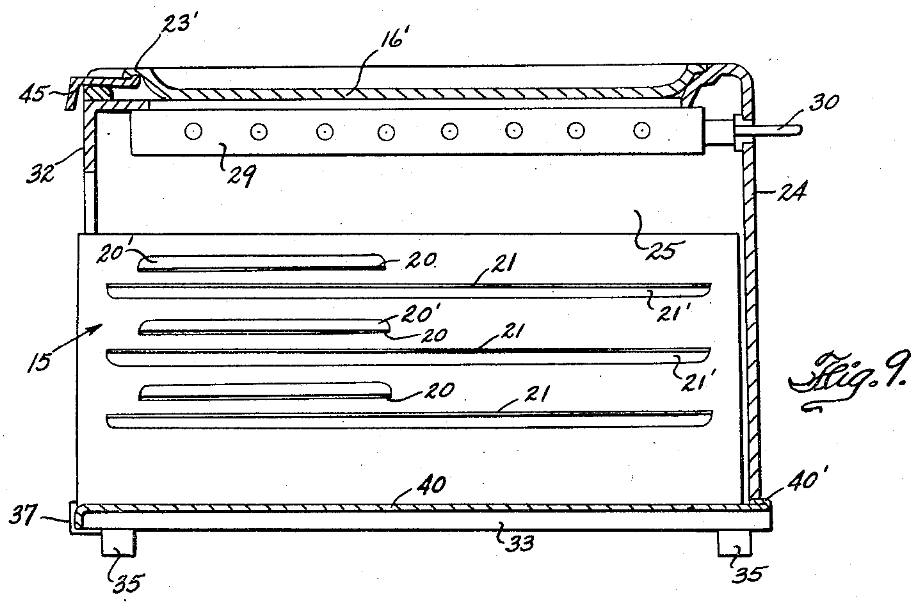
XAN B. K. GREEN,
HARRY PREBLE, JR.,
INVENTORS,
BY- [signature]
ATTORNEY.

United States Patent Office 2,758,589 Patented Aug. 14, 1956

2,758,589

BROILERS

Xan B. K. Green, New Paltz, and Harry Preble, Jr., Cross River, N. Y., assignors to General Slicing Machine Co., Inc., Walden, N. Y., a corporation of New York Application June 18, 1953, Serial No. 362,557

5 Claims. (Cl. 126—41)

The present invention relates to portable broilers, ovens and the like.

The principal object of this invention is to provide an article of the kind mentioned, of novel and improved construction which is easily taken apart for cleaning and easily put together for use.

Another object hereof is to provide a novel and improved broiler including a removable tray rack holding removable food trays slidably thereon within a heating chamber and affording passages for heated air to envelop the food trays and providing a construction whereby the rack is securely positioned so that upon partial withdrawal of a laden tray, the latter will not tilt or fall or dislodge the rack.

A further object thereof is to provide a novel and improved broiler construction which is reasonably cheap to manufacture, capable of all cookery operations and efficient in carrying out the purposes for which it is designed.

Other objects and advantages will become apparent as this disclosure proceeds.

In the accompanying drawings forming part of this specification, similar characters of reference indicate corresponding parts in all the views.

Fig. 1 is a perspective view of a broiler embodying the teachings of this invention.

Fig. 2 is a fragmentary front view of Fig. 1, showing the right hand portion of the front thereof. This view is partly in section. To attain clarity of illustration, only a segment of the right hand side wall of the tray rack is shown unsupported.

Fig. 3 is a perspective view of the tray rack. Slits are shown in the opposite side walls thereof. These slits define strips which are then bent inward to lie horizontal over the floor of the rack to form tray supporting ledges.

Fig. 4 is a perspective view of one of the bottom side rails; one such being along each bottom side edge of the broiler casing.

Fig. 5 shows a front view of the other of such rails fitted with a foot and a forwardly extending clip element arranged to engage the tray rack against movement out of the casing.

Fig. 6 is a fragmentary side view of Fig. 5.

Fig. 7 is a perspective view of the broiler casing drawn to reduced scale. The step around the top opening is omitted here, to attain clarity of illustration.

Fig. 8 is a section taken at lines 8—8 in Fig. 1.

Fig. 9 is an enlarged section taken at lines 9—9 in Fig. 1.

In the drawings, the numeral 15 designates generally a rack structure for holding one or more food trays 16 within the broiler casing 17. This U-shaped rack is a channel made of sheet metal. The side walls 18, 19 of such channel have pairs of U-shaped slits 11, 12, cut therein and the elongated strips defined by such slits are bent inwardly of the channel to form the horizontal ledges as 20, 21. Said slits are so cut that the upper ledge 20 of each pair of successive ledges, is downwardly bent to horizontal position, while the lower ledge 21 needs to be upwardly bent to lie horizontal. The distance between a pair of ledges is preferably just suitable to admit the peripheral flange 23 of a fod tray 16, and the lower ledge 21 extends further to the front of the broiler casing 17 than does the upper ledge 20, to permit easy entry of the trays. Corresponding ledges on the side walls of the tray-supporting rack 15 are co-planar to support a food tray.

The broiler casing 17 is preferably a casting having a back wall 24, side walls 25, 26 and no bottom wall. Most of its front and preferably most of its top, are open. The top inward peripheral flange 27, defines the large top opening 28 to receive a food tray 16'; the peripheral flange 23' of such tray, resting on the flange 27. The top opening 28 of the casing, has across all of it interior the casing, the heating member 29, which is secured in such position above the bottom edge of the front wall top portion 32, by any suitable means and if desired may be removable. Said heating member serves as the ceiling of the casing, and this embodiment illustrated to be of the electrical type, it has the exteriorly extending male plug terminals 30 for connection with an electric current supply.

At each side of the casing 17, there is the comparatively narrow upright front wall portion 31. These front wall portions are joined by a front wall portion 32 extending across the top of the casing, downwardly from the top peripheral flange 27, to a plane a little below the bottom of the heating member 29. This leaves the front of the casing practically all open, through which the tray rack 15 is set into same. The distance between the outer surfaces of the side walls of the tray rack structure 15, is of a dimension to fit loose between the upright front wall portions 31.

Secured along the underside of each of the side walls of the casing 17, is a rail. There rails 33, 34 are provided with feet 35, and have a step indicated by the numerals 33', 34' respectively. These steps are downwardly into the casing, and together serve as a track and seat for the tray rack 15, for they are clear of the inner edges of the upright front wall portions 31, so that said tray rack can enter upon such steps from the front of the casing, though it rests in full contact with said steps after setting is made of the front downward flange 41 in the space between the clip 37 and the front edge of the associated rail as will be explained.

The forward edges of the side walls of the tray rack 15, each have an outward flange, as 38, 39 respectively, which when said rack is within the casing 17, overlap the respective upright front wall portions 31. The floor 40, at its forward end is provided with a downward flange 41 which sets in the space between the clips 37 and the forward ends of the rails 33, 34. These clips are metal angle pieces secured to said rails respectively, so that the tab portions 37' thereof are spaced forwardly of the front ends of the said rails 33, 34, the space 47 to receive the floor's downward flange 41, in snug fit. Said floor 40 of the tray rack 15 extends beyond the rear edges of the side walls as at 40'. This portion 40', when the said rack is within the casing 17, is under and contacts the underside 24' of the rear casing wall 24. Said rearwardly extending floor portion 40' may be made double ply to accomplish such contact and the plane of the steps 33', 34' are made to suit.

The openings 20' made in forming the upper ledges 20, are communicative with the space above a food tray 16 on the associated lower ledge 21, and the openings 21' made in forming the lower ledges, are communicative with the space below such mounted food tray. All these openings lead into flues 42 formed between the side walls of the tray rack 15 and the side walls of the casing 17.

Said rails 33, 34, close the bottom ends of said flues respectively, and if desired, may be provided with apertures 43.

The casing 17 may be provided with handles 44, and the handles for the food trays may be of the detachable type as 45 so that one handle may fit either of the trays 16, 16'. In such instance, the body of the casing 17 should have suitable recess to receive the handle mount 46 for the latter to fit flush with the casing body surface.

It is to be noted that the tabs 37' each forming an upright channel structure along the front edge of the rails 33, 34, hold the tray rack 15 from sliding out of the casing 17, and that the bottom edge 24' of the rear wall 24 of the casing holds said tray rack from tilting even when laden food trays as 16 is partially withdrawn out of the casing, because the edge 24' acts as a stop against the floor of the tray rack 15.

The openings 20' and 21' and the provision of the flues 42 permit circulation of the heated air within the casing 17 both above and below the food tray, so that such tray 16 is heat enveloped.

To dismantle the broiler, the tray rack 15 is lifted at the front until the flange 41 is above the top edges of the tabs 37'. Said rack can now be slid forwardly out of the casing and easily cleaned. The entire interior and exterior of the casing 17 can now be easily cleaned, and the trays 16, 16', of course.

The rails 33, 34 and the handles 44, 45 may be of wood and finished to lend decorative value. The rack 15 may be a punch press product. The casing as mentioned, and the trays may be castings; same requiring practically no machining. With little work, the wood parts are mounted on the casing 17. The cost of manufacture is kept extremely low.

To assemble the broiler, set the rear edge of the floor of the tray-supporting rack 15 over the tops of the tabs 37' and onto the steps 33', 34'; said floor being held tilted upwardly, outwardly of the casing 17. Now slide the tray rack on said steps into the casing and set the front flange 41 of the tray rack into the channel spaces 47 immediately behind the tabs 37'. The rearwardly extending end 40' of the tray rack's floor will be under the bottom edge 24' of the rear wall of the casing 17. The device is ready for use upon heater operation.

The top and inner trays are made interchangeable so that the same tray may be used at either position. With the top tray removed, cooking can be done by setting pots and pans directly atop the heater. With tray in place atop the casing, it can be used as a griddle. Tray position within the casing is of course changeable and more than one tray at one time may be used for food preparation.

This invention is capable of numerous forms and various applications without departing from the essential features herein disclosed. It is therefore intended and desired that the embodiment shown herein be deemed illustrative and not restrictive and that the patent shall cover all patentable novelty herein set forth; reference being had to the following claims rather than to the specific description herein to indicate the scope of this invention.

We claim:

1. A broiler comprising an open bottom casing having side and rear walls and comparatively narrow front wall side portions connected by a front wall top portion to afford a comparatively large front opening for the casing, a heating means mounted within the casing above the bottom edge of said front wall top portion, a pair of rails; the said side walls of the casing standing on said rails respectively and fixedly secured thereto; said rails extending inwardly of said side walls and rearwardly from the front surface of the casing and each rail having a longitudinal downward step extending within the casing; said steps being between the opposite inner edges of said front wall side portions, an upright channel along the front edges of said rails, a separate upright U-shaped tray-supporting member of rigid sheet material comprising side walls extending upward from a bottom wall; said bottom wall having its rear edge extending rearwardly of its said associated side walls and provided with a downward flange along its front edge; each of said associated side walls of the U-shaped member having an outwardly laterally extending flange at their front edges respectively; said tray supporting member being removably positioned within the casing through the front opening of said casing whereby tis bottom wall rests on said steps on the rails; the downward flange being positioned within the channels along the front edges of the rails; the rear edge of the bottom wall lying below and adjacent the bottom edge of the rear end of the casing and the side flanges on the side walls of said member overlapping the respective front surfaces of the front wall side portions, means on the inner surfaces of the side walls of said member for supporting a tray in suspension between them and a separate tray supported on said means; said tray when laden and pulled partly out of the casing, causing the rear end of the bottom wall of said member to bear against the bottom edge of the rear wall of the casing.

2. A broiler as defined in claim 1, wherein the rear end of the bottom wall of the tray-supporting member carries an element which contacts the bottom edge of the rear wall of the casing when said member is positioned within the casing as set forth.

3. A broiler as defined in claim 1, including feet carried by the rails and wherein the side walls of the tray-supporting member have openings above and below the tray and wherein each of the rails has an opening therethrough; all of said openings being directly communicative with the space between the side walls of the casing and said member.

4. A broiler as defined in claim 1, wherein the channels along the front edge of each of the rails is afforded by an angle piece secured to the bottom of each rail; a part of each angle piece extending upwardly spaced in front of the rail it is mounted on.

5. A broiler as defined in claim 1, wherein the tray includes a perimetral flange and wherein the tray supporting means comprises a pair of spaced ledges one above the other holding said flange between them in sliding contact therewith; the side edge of the lower ledge nearest the front of the casing being forward of the corresponding edge of the upper ledge.

References Cited in the file of this patent

UNITED STATES PATENTS

| | | |
|---|---|---|
| 257,018 | Kellett | Apr. 25, 1882 |
| 980,680 | Ross | Jan. 3, 1911 |
| 1,585,404 | Melvin | May 18, 1926 |
| 1,694,762 | Ackerman | Dec. 11, 1928 |
| 1,817,118 | Adami | Aug. 4, 1931 |
| 1,959,198 | Conry | May 15, 1934 |
| 2,221,870 | Kahn | Nov. 19, 1940 |
| 2,664,490 | Allgeyer | Dec. 29, 1953 |